United States Patent
Kim et al.

(10) Patent No.: US 9,239,491 B2
(45) Date of Patent: *Jan. 19, 2016

(54) OPTICAL ELEMENT

(71) Applicant: LG CHEM, LTD., Seoul (KR)

(72) Inventors: Sin Young Kim, Daejeon (KR); Jae Hoon Shim, Daejeon (KR); Ki Uk Lim, Chungcheongbuk-do (KR); Yeong Rae Chang, Daejeon (KR); Moon Soo Park, Daejeon (KR); Soo Kyoung Lee, Chungcheongbuk-do (KR); Hyun Hee Son, Chungcheongbuk-do (KR); Hyuk Yoon, Gyeonggi-do (KR)

(73) Assignee: LG CHEM, LTD., Seoul (KR)

( * ) Notice: Subject to any disclaimer, the term of this patent is extended or adjusted under 35 U.S.C. 154(b) by 47 days.

This patent is subject to a terminal disclaimer.

(21) Appl. No.: 14/167,638

(22) Filed: Jan. 29, 2014

(65) Prior Publication Data

US 2014/0146252 A1 May 29, 2014

Related U.S. Application Data

(63) Continuation of application No. 13/627,781, filed on Sep. 26, 2012, now Pat. No. 8,758,869, which is a continuation of application No. PCT/KR2011/008592, filed on Nov. 10, 2011.

(30) Foreign Application Priority Data

| Nov. 10, 2010 | (KR) | 10-2010-0111757 |
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0110092 |
| Oct. 26, 2011 | (KR) | 10-2011-0110093 |
| Oct. 26, 2011 | (KR) | 10-2011-0110096 |
| Nov. 10, 2011 | (KR) | 10-2011-0117232 |

(51) Int. Cl.
| G02F 1/1334 | (2006.01) |
| G02F 1/13363 | (2006.01) |
| C09K 19/20 | (2006.01) |
| C09K 19/54 | (2006.01) |
| G02B 27/22 | (2006.01) |
| G02B 27/26 | (2006.01) |
| G02B 5/30 | (2006.01) |

(52) U.S. Cl.
CPC .......... *G02F 1/13363* (2013.01); *G02B 5/3016* (2013.01); *G02B 27/2214* (2013.01); *G02B27/26* (2013.01); *Y10T 428/10* (2015.01); *Y10T 428/1036* (2015.01); *Y10T 428/1041* (2015.01); *Y10T 428/1059* (2015.01); *Y10T 428/1064* (2015.01); *Y10T 428/1068* (2015.01); *Y10T 428/1073* (2015.01); *Y10T 428/1077* (2015.01); *Y10T 428/1082* (2015.01)

(58) Field of Classification Search
CPC .. G02B 5/3015; G02B 27/2214; G02B 27/26; G02F 1/1334; G02F 1/13363; G02F 1/133365; C09K 19/544; C09K 2019/0448; Y10T 428/1041; Y10T 428/1059; Y10T 428/1082; Y10T 428/1068; Y10T 428/1073; Y10T 428/1077

See application file for complete search history.

(56) References Cited

U.S. PATENT DOCUMENTS

| 6,368,760 B1 | 4/2002 | Nishiguchi |
| 7,476,423 B2 | 1/2009 | Hirai |

(Continued)

FOREIGN PATENT DOCUMENTS

| CN | 101208620 A | 6/2008 |
| CN | 101395526 A | 3/2009 |

(Continued)

*Primary Examiner* — Shean C Wu
(74) *Attorney, Agent, or Firm* — Dentons US LLP

(57) ABSTRACT

An optical element is provided. The optical element is a light-dividing element, for example an element that can divide incident light into at least two kinds of light having different polarized states. The optical element can be used to realize a stereoscopic image.

16 Claims, 11 Drawing Sheets

(56) References Cited

U.S. PATENT DOCUMENTS

| | | | |
|---|---|---|---|
| 8,758,868 B2 * | 6/2014 | Kim et al. .................. 428/1.1 |
| 8,758,869 B2 * | 6/2014 | Kim et al. .................. 428/1.1 |
| 2008/0014374 A1 | 1/2008 | Hirai |
| 2008/0170294 A1 | 7/2008 | Kuroda et al. |
| 2008/0252973 A1 | 10/2008 | Akari et al. |
| 2012/0257128 A1 | 10/2012 | Seo et al. |
| 2012/0257129 A1 | 10/2012 | Seo et al. |
| 2013/0044286 A1 | 2/2013 | Yoon et al. |

FOREIGN PATENT DOCUMENTS

| | | |
|---|---|---|
| CN | 101424766 A | 5/2009 |
| JP | 10-153707 A | 6/1998 |
| JP | 10153707 A | 6/1998 |
| JP | 2003207641 A | 7/2003 |
| JP | 2006293098 A | 10/2006 |
| JP | 2007504484 A | 1/2007 |
| JP | 2008158536 A | 7/2008 |
| JP | 2009109860 A | 5/2009 |
| JP | 2010044211 A | 2/2010 |
| JP | 2010-085504 A | 4/2010 |
| JP | 2010085573 A | 4/2010 |
| JP | 2010085794 A | 4/2010 |
| JP | 2010237699 A | 10/2010 |
| KR | 10-0209187 B1 | 7/1999 |
| KR | 10-2009-0082065 A | 7/2009 |
| KR | 10-2008-0075779 A | 8/2009 |
| TW | 1253522 B | 4/2006 |
| TW | 200804569 A | 1/2008 |
| WO | 2005019379 A1 | 3/2005 |
| WO | 2008029766 A1 | 3/2008 |

* cited by examiner

Fig. 3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig. 11

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

CROSS-REFERENCE TO RELATED APPLICATION

This application is a continuation of U.S. patent application Ser. No. 13/627,781, filed on Sep. 26, 2012, which is a Continuation Bypass Application of International Application No. PCT/KR2011/008592, filed Nov. 10, 2011, and claims priority to and the benefit of Korean Patent Application Nos. 10-2010-00111757, filed Nov. 10, 2010, 10-2010-0111758, filed on Nov. 10, 2010, 10-2010-0124411, filed on Dec. 7, 2010, 10-2011-0057830, filed Jun. 15, 2011, 10-2011-0110092, filed Oct. 26, 2011, 10-2011-0110093, filed Oct. 26, 2011, 10-2011-0110096, filed Oct. 26, 2011, and 10-2011-0117232, filed on Nov. 10, 2011, the disclosures of which are incorporated herein by reference in their entirety.

BACKGROUND

1. Field of the Invention

The present invention relates to an optical element and a stereoscopic image display device.

2. Discussion of Related Art

Techniques of dividing light into at least two kinds of light having different polarized states may be effectively used in various fields.

The light division techniques may be, for example, applied to manufacture of stereoscopic images. The stereoscopic images may be realized using binocular disparity. For example, when two 2-dimensional images are input into the human left and right eyes, respectively, the input information is transmitted and combined in the brain, which makes it possible for a human being to experience 3-dimensional (3D) senses of depth and reality. Therefore, the light division techniques may be used during this procedure.

Techniques of generating a stereoscopic image may be effectively used for 3D measurements, and also used in 3D TV, cameras or computer graphics.

SUMMARY OF THE INVENTION

The present invention is directed to providing an optical element and a stereoscopic image display device.

One aspect of the present invention provides an optical element. The optical element according to one exemplary embodiment may include a liquid crystal layer, a base layer and a polarizer, which are sequentially formed.

FIG. 1 is a cross-sectional view of an optical element 1 according to one exemplary embodiment, showing a structure of the optical element 1 in which a liquid crystal layer 11, a base layer 12 and a polarizer 13 are sequentially formed.

According to one exemplary embodiment, the optical element may be an element that can divide incident light into two or more kinds of light having different polarized states. Such an element may be, for example, used to realize a stereoscopic image.

The liquid crystal layer may have a difference between in-plane refractive indexes in a slow axis direction and a fast axis direction of 0.05 to 0.2, 0.07 to 0.2, 0.09 to 0.2 or 0.1 to 0.2. As such, the in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. In general, the fast axis and slow axis in an optically anisotropic liquid crystal layer are formed vertically to each other. The refractive indexes may be measured with respect to light at a wavelength of 550 nm or 589 nm.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for use in applications. According to one exemplary embodiment, the liquid crystal layer satisfying the relationship of the refractive indexes and having the thickness may be suitable for use in an optical element for optical division.

The liquid crystal layer may include a multifunctional polymerizable liquid crystal compound and a monofunctional polymerizable liquid crystal compound, and the liquid crystal compounds may be included in the liquid crystal layer in a polymerized form.

In this specification, the term "multifunctional polymerizable liquid crystal compound" may refer to a compound that shows a liquid crystalline property because it includes a mesogen backbone, and also contains at least two polymerizable functional groups. According to one exemplary embodiment, the multifunctional polymerizable liquid crystal compound may contain 2 to 10, 2 to 8, 2 to 6, 2 to 5, 2 to 4, 2 to 3, or 2 polymerizable functional groups.

In this specification, the term "monofunctional polymerizable liquid crystal compound" may also refer to a compound that shows a liquid crystalline property because it includes a mesogen backbone, and also contains at least one polymerizable functional group.

Also, in this specification, the expression "liquid crystal compound being included in a liquid crystal layer in a polymerized form" may refer to a state in which the liquid crystal compound is polymerized to form a liquid crystal polymer in the liquid crystal layer.

When the liquid crystal layer includes a multifunctional and monofunctional polymerizable compound, the liquid crystal layer may have more excellent phase retardation properties, and the realized phase retardation properties, for example, the optical axis and a phase retardation value of the liquid crystal layer, may be stably maintained under the severe conditions.

According to one exemplary embodiment, the multifunctional or monofunctional polymerizable liquid crystal compound may be a compound represented by the following Formula 1.

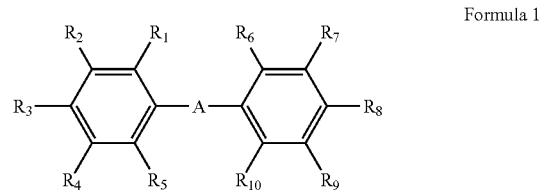

Formula 1

In Formula 1, A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 2, provided that at least one of the substituents $R_1$ to $R_{10}$ is —O-Q-P or a substituent of the following Formula 2, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is a polymerizable functional group such an alkenyl group, an epoxy group, a cyano group, a carboxyl group, an acryloyl group, a methacryloyl group, an acryloyloxy group or a methacryloyloxy group.

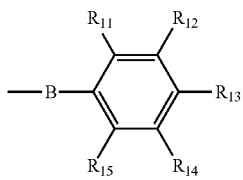

Formula 2

In Formula 2, B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the expression "two adjacent substituents are joined together to form a benzene ring substituted with —O-Q-P" may mean that the two adjacent substituents are joined together to form a naphthalene backbone substituted with —O-Q-P as a whole.

In Formula 2, "—" indicated on the left side of B may mean that B is directly bound to the benzene ring of Formula 1.

In Formulas 1 and 2, the term "single bond" means that no additional atoms are present in a moiety represented by A or B. For example, when A in Formula 1 is a single bond, the benzene rings disposed on both sides of A may be directly bound to form a biphenyl structure.

In Formulas 1 and 2, the halogen may be chlorine, bromine or iodine.

Unless otherwise defined in this specification, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

Unless otherwise defined in this specification, the term "alkoxy group" may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Also, unless otherwise defined in this specification, the term "alkylene group or alkylidene group" may refer to an alkylene group or alkylidene group having 1 to 12 carbon atoms, 4 to 10 carbon atoms or 6 to 9 carbon atoms. The alkylene group or alkylidene group may be linear, branched or cyclic. Also, the alkylene group or alkylidene group may be optionally substituted with one or more substituents.

Also, unless otherwise defined in this specification, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic. Also, the alkenyl group may be optionally substituted with one or more substituents.

Also, in Formulas 1 and 2, P may be preferably an acryloyl group, a methacryloyl group, an acryloyloxy group or a methacryloyloxy group, more preferably an acryloyloxy group or a methacryloyloxy group, and most preferably an acryloyloxy group.

In this specification, the substituent which may be substituted with a certain functional group may be an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

The —O-Q-P which may be present in plural numbers in Formula 1 and 2 or the residue of Formula 2 may be, for example, present in a position of $R_3$, $R_8$ or $R_{13}$. Preferably, $R_3$ and $R_4$, or $R_{12}$ and $R_{13}$ may be joined together to form a benzene ring substituted with —O-Q-P. Also, in the compound of Formula 1 or the residue of Formula 2, the substituent other than the —O-Q-P or the residue of Formula 2, or the substituents other than those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, an alkoxy group having 1 to 4 carbon atoms, a cyano group or a nitro group, and preferably chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The liquid crystal layer may include the monofunctional polymerizable liquid crystal compound in an amount of greater than 0 parts by weight and less than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight or 1 part by weight to 20 parts by weight, relative to 100 parts by weight of the multifunctional polymerizable liquid crystal compound.

The mixing of the multifunctional and monofunctional polymerizable liquid crystal compounds may be maximized within this content range. Also, the liquid crystal layer may exhibit an excellent adhesive property to the adhesive layer. Unless otherwise defined in this specification, the unit "part by weight" may mean a weight ratio.

The multifunctional and monofunctional polymerizable liquid crystal compounds may be included in the liquid crystal layer in a horizontally aligned state. In this specification, the term "horizontal alignment" may mean that the optical axis of a liquid crystal layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer. In this specification, the term "optical axis" may refer to a fast axis or slow axis formed when incident light penetrates through a corresponding region.

The liquid crystal layer may be formed so that incident light, for example, light passing through the polarizer, can be divided into two or more kinds of light having different polarized states. For this purpose, the liquid crystal layer may include, for example, first and second regions having different phase retardation properties. In this specification, the fact that the first and second regions have the different phase retardation properties may include a case in which the first and second regions have optical axes formed in the same or different directions and also have different phase retardation values, and a case in which the first and second regions have optical axes formed in different directions while having the same phase retardation value, in a state where both the first and second regions have the phase retardation properties. According to another exemplary embodiment, the fact that the first and second regions have the different phase retardation properties may include a case in which one of the first and second regions has a phase retardation property, and the other region is an optically isotropic region having no phase retardation property. In this case, for example, the liquid crystal layer may be formed so that it can include both of a region including a liquid crystal material and a region free of the liquid crystal material. The phase retardation property of the first or second region may be regulated, for example, by controlling an alignment state of the liquid crystal compound, the refractive index relationship of the liquid crystal layer or a thickness of the liquid crystal layer.

According to one exemplary embodiment, the first region A and the second region B may be formed in stripe shapes extending in the same direction and alternately arranged adjacent to each other, as shown in FIG. 2, or they may be formed in a lattice pattern and alternately arranged adjacent to each other, as shown in FIG. 3.

When the optical element is used to display a stereoscopic image, one of the first and second regions may refer to a region configured to control polarization of an image signal for the left eye (hereinafter referred to as "LC region"), and the other region may refer to a region configured to control polarization of an image signal for the right eye (hereinafter referred to as "RC region").

According to one exemplary embodiment, the two or more kinds of light having the different polarized states, which are divided by the liquid crystal layer including the first and second regions, may include two kinds of linearly polarized light having directions, which are substantially vertical to each other, or include left-circularly polarized light and right-circularly polarized light.

Unless otherwise defined in this specification, when terms such as vertical, horizontal, perpendicular or parallel are used in definitions of angles, the terms refer to an angle being substantially vertical, horizontal, perpendicular or parallel. For example, the terms include errors in consideration of manufacturing errors or variations. Therefore, the terms may, for example, include an error of not more than approximately ±15°, preferably an error of not more than approximately ±10°, and most preferably an error of not more than approximately ±5°.

According to one exemplary embodiment, one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. In this case, the regions of the liquid crystal layer including the polymerizable liquid crystal compound may be formed on only one of the first and second regions. As such, the regions in which the liquid crystal layer is not formed may be an empty space, or may be a region in which a glass, or optically isotropic resin layer, resin film or sheet is formed.

According to another exemplary embodiment, one of the first and second regions may be a region through which incident light can penetrate when the incident light is converted into left-circularly polarized light, and the other region may be a region through which incident light can penetrate when the incident light is converted into right-circularly polarized light. In this case, the first and second regions may be regions having optical axes formed in different directions while having the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

According to one exemplary embodiment, the first and second regions may have the same phase retardation value, for example, a value required to phase-retard incident light by ¼ of the wavelength of the incident light, and also have optical axes formed in different directions. As such, the optical axes formed in the different directions may be, for example, at right angles.

When the first and second regions have the optical axes formed in different directions, a line bisecting an angle formed between the optical axes of the first and the second regions is preferably drawn so that the line can be vertical or horizontal with respect to the absorption axis of the polarizer.

FIG. 4 is a schematic diagram explaining the arrangement of the optical axes of the first and second regions when the first and second regions A and B shown in FIG. 2 or 3 have optical axes formed in different directions. Referring to FIG. 4, a line bisecting an angle formed between the optical axes of the first and second regions A and B may refer to a line bisecting an angle of $(\Theta 1 + \Theta 2)$. For example, when $\Theta 1$ and $\Theta 2$ are the same angle, the angle-bisecting line may be formed in a direction horizontal with respect to a boundary line L between the first and second regions A and B. As such, an angle, namely $(\Theta 1 + \Theta 2)$, formed between the optical axes of the first and second regions A and B may also be, for example, 90°.

The above-described optical element may satisfy the conditions of the following Equation 1.

$$X < 8\% \qquad \text{Equation 1}$$

In Equation 1, X represents a percentage of the absolute value of a variation in a phase difference value of the liquid crystal layer obtained when the optical element is kept at 80° C. for 100 hours or 250 hours, relative to the initial phase difference value of the liquid crystal layer of the optical element.

For example, X may be calculated as follows: $100 \times (|R_0 - R_1|)/R_0$. Here, $R_0$ is an initial phase difference value of the liquid crystal layer of the optical element, and $R_1$ represents a phase difference value of the liquid crystal layer obtained when the optical element is kept at 80° C. for 100 hours or 250 hours.

X may be preferably 7% or less, 6% or less or 5% or less. A variation of the phase difference value may be measured using a method presented in the following Examples.

The optical element includes a base layer with the liquid crystal layer formed thereupon. The base layer may be in a single-layer or multilayer structure.

For example, a glass base layer or a plastic base layer may be used as the base layer. Examples of the plastic base layer may include a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); polyvinyl alcohol (PVA); poly ether sulfone (PES); polyetheretherketone (PEEK); polyetherimide (PEI); polyethylene naphthalate (PEN); a polyester such as polyethylene terepthalate (PET); polyimide (PI); polysulfone (PSF); or a fluorine resin.

The base layer, for example, the plastic base layer, may have a lower refractive index than the liquid crystal layer. The refractive index of the base layer according to one exemplary embodiment is in a range of approximately 1.33 to approximately 1.53. When the base layer has a lower refractive index than the liquid crystal layer, it is, for example, desirable in that it enhances brightness, prevents reflection and improves contrast characteristics.

The plastic base layer may be optically isotropic or anisotropic. As such, when the base layer is optically anisotropic, the optical axis of the base layer is preferably arranged so that the optical axis of the base layer can be vertical or horizontal with respect to the above-mentioned line bisecting an angle formed between the optical axes of the first region and the second region.

According to one exemplary embodiment, the base layer may include an ultraviolet (UV) protector or absorbent. When the base layer includes the UV protector or absorbent, it is possible to prevent degradation of the liquid crystal layer caused by UV rays. Examples of the UV protector or absorbent may include an organic matter such as a salicylic acid ester compound, a benzophenone compound, an oxybenzophenone compound, a benzotriazol compound, a cyanoacrylate compound or a benzoate compound, or an inorganic matter such as zinc oxide or a nickel complex salt. The content of the UV protector or absorbent in the base layer is not particularly limited, and may be properly selected in consideration of desired effects. For example, in the manufacture of the plastic base layer, the UV protector or absorbent may be included in an amount of approximately 0.1% by weight to 25% by weight, relative to the weight ratio of the main material of the base layer.

A thickness of the base layer is not particularly limited, and may be properly regulated according to a desired purpose of use. The base layer may have a single-layer or multilayer structure.

The optical element according to one exemplary embodiment may further include an alignment layer disposed between the base layer and the liquid crystal layer. The alignment layer may serve to align a liquid crystal compound during formation of the optical element. As the alignment layer, a conventional alignment layer known in the art, for example, an optical alignment layer or a rubbing alignment layer may be used. The alignment layer is an optional configuration, and an alignment property may be granted without using an alignment layer by directly rubbing or elongating the base layer.

The polarizer formed in a bottom portion of the base layer of the optical element is a functional element that can extract light vibrating in one direction from incident light while vibrating in various directions. For example, a conventional polarizer such as a PVA polarizer may be used as the polarizer.

According to one exemplary embodiment, the polarizer may be a PVA film or sheet in which a dichroic dye or iodine is absorbed and aligned. The PVA may, for example, be obtained by gellation of a polyvinylacetate. Examples of the polyvinylacetate may include a monopolymer of vinyl acetate; and a copolymer of vinyl acetate and another monomer. As such, examples of the other monomer copolymerized with vinyl acetate may include at least one selected from an unsaturated carboxylic acid compound, an olefin compound, a vinylether compound, an unsaturated sulfonic acid compound and an acrylamide compound having an ammonium group. A gelling degree of the polyvinylacetate may generally be in a range of approximately 85 mol % to approximately 100 mol %, or 98 mol % to 100 mol %. A polymerization degree of the PVA used in the polarizer may generally be in a range of approximately 1,000 to approximately 10,000, or approximately 1,500 to approximately 5,000.

According to one exemplary embodiment, the polarizer may be attached to the base layer by means of a water-based adhesive. FIG. 5 shows an optical element 5 according to one exemplary embodiment in which a polarizer 13 is attached to a base layer 12 by means of a water-based adhesive 51. As such, the water-based adhesive may be used without particular limitation as long as it can realize a proper adhesive property. According to one exemplary embodiment, a polyvinyl alcohol-based water-based adhesive generally used to attach a polarizer to a protective film of the polarizer, that is, attach a PVA-based polarizer to a triacetyl cellulose (TAC) film in manufacture of a polarizing plate, may be used as the water-based adhesive.

The optical element may further include a surface-treated layer formed on a top portion of the liquid crystal layer. FIG. 6 shows an optical element 6 according to one exemplary embodiment in which a surface-treated layer 61 is formed on a top portion of a liquid crystal layer 11.

Examples of the surface-treated layer may include a high-hardness layer, an glare-preventing layer such as AG (anti-glare) layer or SG (semi-glare) layer, or a low reflective layer such as AR (anti reflection) or LR (low reflection) layer.

The high-hardness layer may have a pencil hardness of 1H or more or 2H or more at a load of 500 g. The pencil hardness may be, for example, measured according to the ASTM D 3363 standard using pencil leads prescribed in KS G 2603.

The high-hardness layer may be, for example, a resin layer having high hardness. The resin layer may, for example, include a room-temperature-curable, moisture-curable, thermocurable or active energy ray-curable resin composition in a cured state. According to one exemplary embodiment, the resin layer may include a thermocurable or active energy ray-curable resin composition, or an active energy ray-curable resin composition in a cured state. In description of the high-hardness layer, the term "cured state" may refer to a state where components included in each resin composition are subjected to a cross-linking reaction or a polymerization reaction to convert the resin composition into a hard state. As such, the room-temperature-curable, moisture-curable, thermocurable or active energy ray-curable resin composition may also refer to a composition whose cured state may be induced at room temperature or induced in the presence of suitable moisture or by application of heat or irradiation with active energy rays.

A variety of resin compositions which can satisfy this range of pencil hardness when they are cured are known in the art, and a suitable resin composition may be readily selected by a person of ordinary skill in the art.

According to one exemplary embodiment, the resin composition may include an acryl compound, an epoxy compound, a urethane-based compound, a phenol compound or a polyester compound as a main component. As such, the term "compound" may be a monomeric, oligomeric or polymeric compound.

According to one exemplary embodiment, an acryl resin composition having excellent optical properties such as transparency and superior yellowing resistance, preferably an active energy ray-curable acryl resin composition, may be used as the resin composition.

The active energy ray-curable acryl composition may, for example, include an active energy ray-polymerizable polymer component and a reactive diluting monomer.

As such, examples of the polymer component may include a component generally known in the art as an active energy ray-polymerizable oligomer, such as urethane acrylate, epoxy acrylate, ether acrylate or ester acrylate, or a polymerization product of a mixture including a monomer such as a (meth)acrylic ester monomer. As such, examples of the (meth)acrylic ester monomer may include alkyl(meth)acrylate, (meth)acrylate having an aromatic group, heterocyclic (meth)acrylate or alkoxy (meth)acrylate. A variety of polymer components used to prepare the active energy ray-curable composition are known in the art, and the above-described compounds may be selected, when necessary.

The reactive diluting monomer that may be included in the active energy ray-curable acryl composition may be a monomer having one or two or more active energy ray-curable functional groups, for example, acryloyl groups or methacryloyl groups, and the (meth)acrylic ester monomer or the multifunctional acrylate may be, for example, used as the reactive diluting monomer.

The selection of the components and a blending ratio of the selected components used to prepare the active energy ray-curable acryl composition are not particularly limited, and may be adjusted in consideration of desired hardness and other physical properties of the resin layer.

For example, a resin layer having an uneven surface formed therein and a resin layer including particles may be used as the AG or SG layer. Also, another resin layer including particles having a different refractive index than the particles of the resin layer may also be used.

A resin layer used for formation of the high-hardness layer may be, for example, used as the resin layer. When the anti-glare layer is formed, the components of the resin composition may not necessarily be adjusted so that the resin layer can show high hardness, but it is advantageous in that a surface-treated layer having both functions of the high-hardness layer and the anti-glare layer may be formed when the particles are blended into a resin layer for forming the high-hardness layer.

As such, a method of forming an uneven surface on a resin layer is not particularly limited. For example, the uneven structure may be realized by curing the resin composition while keeping a coating layer of the resin composition in contact with a mold having a desired uneven structure, or by blending particles having proper particle sizes with a resin composition, coating and curing the resin composition.

The anti-glare layer may also be formed using particles having a different refractive index than the resin layer.

According to one exemplary embodiment, the particles have a difference in refractive index from the resin layer of 0.03 or less or 0.02 to 0.2. When the difference in refractive index is extremely small, it is difficult to induce haze, whereas, when the difference in refractive index is extremely high, scattering in the resin layer may often cause an increase in haze, but light transmittance or contrast characteristics may be degraded. Therefore, suitable particles may be selected in consideration of these facts.

The shape of the particles included in the resin layer is not particularly limited, but may for example be a spherical, oval, polyhedral, amorphous or other shape. The particles may have an average diameter of 50 nm to 5,000 nm. According to one exemplary embodiment, particles having an uneven surface formed therein may be used as the particles. Such particles may for example have an average surface roughness (Rz) of 10 nm to 50 nm or 20 nm to 40 nm, and/or a maximum height of protrusions formed on the surface of particles may be in a range of approximately 100 nm to 500 nm or 200 nm to 400 nm, and a width between the protrusions may be in a range of 400 nm to 1,200 nm or 600 nm to 1,000 nm. Such particles are highly compatible with the resin layer, and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate or barium sulfate, and examples of the organic particles may include particles including a cross-linked or uncross-linked product formed of an organic material such as an acryl resin, a styrene resin, a urethane resin, a melamine resin, a benzoguanamine resin, an epoxy resin or a silicone resin, but the present invention is not limited thereto.

Neither the uneven structure formed in the resin layer nor the content of the particles is particularly limited. For example, in the case of the AG layer, the shape of the uneven structure or the content of the particles may be adjusted so that a haze value of the resin layer may be in a range of approximately 5% to 15%, 7% to 13%, or approximately 10%, and, in the case of the SG layer, they may be adjusted so that a haze value of the resin layer may be in a range of approximately 1% to 3%. The haze value may be measured according to the manufacturer's manual using a hazemeter such as HR-100 or HM-150 (commercially available from SEPUNG).

The low reflection layer such as AR or LR layer may be formed by coating a low refractive index material. Low refractive index materials which may be used to form the low reflection layer are widely known in the art. All the low refractive index materials may be properly selected and used in the optical element. The low reflection layer may be formed through coating of the low refractive index material so that the low reflection layer can have reflexibility of approximately 1% or less.

In order to form the surface-treated layer, materials disclosed in Korean Patent Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 or 2009-0049557 may also be used.

The surface-treated layer may be formed using the known materials, either alone or in combination. Examples of the combination may include a case where a high-hardness layer is first formed on a surface of a base layer and a low-reflection layer is then formed on a surface of the high-hardness layer.

The optical element may further include a protection layer attached to a bottom portion of the polarizer. FIG. 7 is a schematic diagram showing an optical element 7 further including a protection layer 71 attached to a bottom portion of a polarizer 13. For example, the protection layer may include a cellulose resin film such as a TAC(triacetyl cellulose) film; a polyester film such as a PET(poly(ethylene terephthalate)) film; a polycarbonate film; a polyethersulfone film; an acryl film; a polyolefin-based film such as a polyethylene, polypropylene or cyclic olefin resin film; or a resin layer that is cured to form a hard layer, but the present invention is not limited thereto.

In addition, the optical element may further include a phase retardation layer arranged on bottom portion of the polarizer. The phase retardation layer may be a ¼-wavelength phase retardation layer or a ½-wavelength phase retardation layer. In this specification, the term "¼- or ½-wavelength phase retardation layer" may refer to a phase retardation element that can phase-retard incident light by ¼ or ½ of a wavelength of the incident light. For example, the optical element having such a structure may be effectively used as an element that is applied to an organic light emitting diode (OLED) to give a light division function and an anti-reflection function. For example, a polymer film which gives birefringence through an elongation process or a liquid crystal layer formed by polymerizing a polymerizable liquid crystal compound may be used as the ¼-wavelength phase retardation layer.

Also, the optical element may further include a pressure-sensitive adhesive layer formed on one surface of the polarizer. For example, the pressure-sensitive adhesive layer may be a pressure-sensitive adhesive layer used to attach the optical element to an optical instrument, for example, a liquid crystal panel of a liquid crystal display device or an image display element of a stereoscopic image display device. FIG. 8 is a schematic diagram showing an optical element 8 in which a pressure-sensitive adhesive layer 81 is formed on a bottom portion of a polarizer 13.

The pressure-sensitive adhesive layer may have a storage modulus at 25° C. of 0.02 MPa or more, 0.03 MPa or more, 0.04 MPa or more, 0.05 MPa or more, 0.06 MPa or more, 0.07 MPa or more, 0.08 MPa, greater than 0.08 MPa, or 0.09 MPa or more. An upper limit of the storage modulus of the pressure-sensitive adhesive is not particularly limited. For example, the storage modulus may be 0.25 MPa or less, 0.2 MPa or less, 0.16 MPa or less, 0.1 MPa or less, or 0.08 MPa or less.

When the pressure-sensitive adhesive layer has this storage modulus, the optical element may show excellent durability, and thus show a stable light division property since the phase retardation property of the phase retardation layer is, for example, stably maintained for a long period of time under the severe conditions. Also, it is possible to prevent side effects such as light leakage in optical instruments using the optical element. In addition, the optical element may show excellent resistance to an external pressure or scratch due to its improved hardness property, thereby properly maintaining reworkability.

The pressure-sensitive adhesive layer may have a thickness of 25 μm or less, 20 μm or less, or 18 μm or less. When the pressure-sensitive adhesive layer has this thickness, the durability, hardness property and reworkability may be further improved. The pressure-sensitive adhesive layer shows excellent physical properties as the pressure-sensitive adhesive layer becomes thin. Here, a lower limit of the thickness is not particularly limited, but the thickness of the pressure-sensitive adhesive layers may be, for example, adjusted within a range of approximately 1 μm or more, or approximately 5 μm or more in consideration of processability.

The pressure-sensitive adhesive layer may include an acryl pressure-sensitive adhesive, a silicon pressure-sensitive adhesive, an epoxy pressure-sensitive adhesive or a rubber-based pressure-sensitive adhesive.

When the pressure-sensitive adhesive layer includes an acryl pressure-sensitive adhesive, the pressure-sensitive adhesive may be, for example, formed by curing a pressure-sensitive adhesive composition including a thermocurable component, an active energy ray-curable component, or both the thermocurable component and the active energy ray-curable component.

As such, the term "curing" may mean a change in a chemical or physical state of a pressure-sensitive adhesive composition to exhibit a pressure-sensitive adhesive property. As such, the thermocurable component and active energy ray-curable component may also refer to a component which is cured by application of suitable heat or irradiation of active energy rays.

The pressure-sensitive adhesive layer formed of the pressure-sensitive adhesive composition including the thermocurable component may include an acrylic polymer cross-linked using a multifunctional cross-linking agent.

For example, an acrylic polymer having a weight average molecular weight of 500,000 or more may be used as the acrylic polymer cross-linked using the multifunctional cross-linking agent. In this specification, the weight average molecular weight is a value converted from that of a polystyrene standard as measured using gel permeation chromatography (GPC). Also, unless otherwise defined in this specification, the term "molecular weight" means a "weight average molecular weight." A polymer having a molecular weight of 500,000 or more may be used to form a pressure-sensitive adhesive layer having excellent durability under severe conditions. An upper limit of the molecular weight is not particularly limited, and the molecular weight of the acrylic polymer may be, for example, adjusted within 2,500,000 or less in consideration of the durability or a coating property of a composition.

According to one exemplary embodiment, the acrylic polymer may include a (meth)acrylic ester monomer and a cross-linking monomer as polymerization units.

For example, alkyl (meth)acrylate may be used as the (meth)acrylic ester-based monomer, and alkyl (meth)acrylate containing an alkyl group having 1 to 20 carbon atoms may be used in consideration of the cohesion, glass transition temperature or pressure-sensitive adhesivity of a pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl(meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, which may be used alone or in combination.

In addition, the polymer may further include a cross-linking monomer as a polymerization unit. For example, the polymer may include 80 parts by weight to 99.9 parts by weight of the (meth)acrylic ester monomer and 0.1 parts by weight to 20 parts by weight of the cross-linking monomer as polymerization units. As such, the term "cross-linking monomer" refers to a monomer that can be copolymerized with another monomer used to form an acrylic polymer and provide a cross-linking functional group to the polymer after the copolymerization. The cross-linking functional group may react with a multifunctional cross-linking agent as will be described later to form a cross-linking structure.

Examples of the cross-linking functional group may include a hydroxyl group, a carboxyl group, an epoxy group, an isocyanate group or a nitrogen-containing functional group such as an amino group. Copolymerizable monomers which can provide the above-mentioned cross-linking functional group in manufacture of a pressure-sensitive adhesive resin are widely known in the art. Examples of the cross-linking monomer may include, but are not limited to, a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl-(meth)acrylate, 2-hydroxyethyleneglycol (meth) acrylate or 2-hydroxypropyleneglycol (meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid and maleic anhydride, or a nitrogen-containing monomer such as (meth)acrylamide, N-vinyl pyrrolidinone or N-vinyl caprolactam, which may be used alone or in combination.

The acrylic polymer may include various other monomers as polymerization units, when necessary. Examples of the other monomers may include a nitrogen-containing monomer such as (meth)acrylonitrile, (meth)acrylamide, N-methyl (meth)acrylamide or N-butoxy methyl (meth)acrylamide; a styrene-based monomer such as styrene or methyl styrene; glycidyl (meth)acrylate; or a carboxylic acid vinyl ester such as vinyl acetate. Such additional monomers may be adjusted to a content of 20 parts by weight or less, relative to the total weight ratio of the other monomers.

The acrylic polymer may be prepared by subjecting a mixture of monomers obtained by optionally selecting and blending the above-described components through a polymerization method such as solution polymerization, photopolymerization, bulk polymerization, suspension polymerization or emulsion polymerization.

Examples of the multifunctional cross-linking agent serving to cross-link the above-described acrylic polymer in the pressure-sensitive adhesive layer may include conventional thermocurable cross-linking agents such as an isocyanate cross-linking agent, an epoxy cross-linking agent, an aziridine cross-linking agent and a metal chelate cross-linking agent. As such, examples of the isocyanate cross-linking agent may include a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4, 4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but the present invention is not limited thereto.

The multifunctional cross-linking agent present in a pressure-sensitive adhesive composition including a thermocurable component or a pressure-sensitive adhesive layer formed of the composition may be, for example, included in an amount of 0.01 parts by weight to 10 parts by weight or 0.01 parts by weight to 5 parts by weight, relative to 100 parts by weight of the acrylic polymer. When a content ratio of the cross-linking agent is adjusted to a content of 0.01 parts by weight or more, it is possible to effectively maintain cohesion of a pressure-sensitive adhesive, whereas, when the content ratio of the cross-linking agent is adjusted to a content of 10 parts by weight or less, it is possible to prevent interlayer detachment or lifting from being caused in the pressure-sensitive adhesive interface and maintain excellent durability. However, the weight ratio may be varied according to desired physical properties such as elastic modulus or inclusion of other cross-linking structures in the pressure-sensitive adhesive layer.

The pressure-sensitive adhesive layer formed of the pressure-sensitive adhesive composition including the active energy ray-curable component may include a cross-linking structure of a polymerized active energy ray-polymerizable compound. The pressure-sensitive adhesive layer may be, for example, formed by blending a compound including at least one functional group which can take part in a polymerization reaction by irradiation of active energy rays, such as, for example, an alkenyl group, an acryloyl group, a methacryloyl group, an acryloyloxy group or a methacryloyloxy group to prepare a pressure-sensitive adhesive composition, and cross-linking and polymerizing the component by irradiating the composition with active energy rays. As such, examples of the compound including the functional group which can take part in the polymerization reaction by irradiation of the active energy rays may include a polymer obtained by introducing a functional group such as an acryloyl group, a methacryloyl group, an acryloyloxy group or a methacryloyloxy group into a side chain of the acrylic polymer; a compound known as an active energy ray-curable oligomer in the art, such as urethane acrylate, epoxy acrylate, polyester acrylate or polyether acrylate; or a multifunctional acrylate as will be described later.

The pressure-sensitive adhesive layer formed of the pressure-sensitive adhesive composition including a thermocurable component and an active energy ray-curable component may have both a cross-linking structure including an acrylic polymer cross-linked using a multifunctional cross-linking agent and a cross-linking structure including a polymerized active energy ray-polymerizable compound.

Such a pressure-sensitive adhesive layer is a pressure-sensitive adhesive including an interpenetrating polymer network (hereinafter referred to as "IPN"). The term "IPN" may refer to a state where at least two cross-linking structures are present in a pressure-sensitive adhesive layer. According to one exemplary embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize an optical element having excellent workability or an excellent ability to prevent light leakage or crosstalk.

The components listed in the pressure-sensitive adhesive composition including the thermocurable component, may be, for example used as the multifunctional cross-linking agent and the acrylic polymer for the cross-linking structure, which is realized by the acrylic polymer cross-linked using the multifunctional cross-linking agent in the pressure-sensitive adhesive layer including the IPN.

Also, the above-described compounds may be used as the active energy ray-polymerizable compound for the cross-linking structure of the polymerized active energy ray-polymerizable compound.

According to one exemplary embodiment, the active energy ray-polymerizable compound may be a multifunctional acrylate. Compounds having at least two (meth)acryloyl groups may be used as the multifunctional acrylate without limitation. For example, the multifunctional acrylate that may be used herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol(meth) acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth) acrylate, propyleneoxide-modified trimethylolpropane tri (meth)acrylate, trifunctional urethane (meth)acrylate or tris (meth)acryloxyethylisocyanurate; a tetrafunctional acrylate such as diglycerin tetra(meth)acrylate or pentaerythritol tetra (meth)acrylate; a pentafunctional acrylate such as propionic acid-modified dipentaerythritol penta(meth)acrylate; and a hexafunctional acrylate such as dipentaerythritol hexa(meth) acrylate, caprolactone-modified dipentaerythritol hexa (meth)acrylate or urethane (meth)acrylate (for example, a reaction product of an isocyanate monomer and trimethylolpropane tri(meth)acrylate, etc.).

Compounds having a ring structure within the molecule may be used as the multifunctional acrylate. The ring structure included in the multifunctional acrylate may be one of a carbocyclic structure or heterocyclic structure; and a monocyclic or polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane (meth)acrylate (for example, a reaction product of an isocyanate monomer and trimethylolpropane tri(meth)acrylate, etc.), but the present invention is not limited thereto.

The active energy ray-polymerizable compound having the cross-linking structure formed in the pressure-sensitive adhesive layer including the IPN may be, for example, included in an amount of 5 parts by weight to 40 parts by weight, relative to 100 parts by weight of the acrylic polymer, but the content of the active energy ray-polymerizable compound may be varied when necessary.

In addition to the above-described components, the pressure-sensitive adhesive layer may include various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a tackifier, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating a pressure-sensitive adhesive composition prepared by blending the above-described components using a tool such as a bar coater or a comma coater, and curing the coated pressure-sensitive adhesive composition. Also, a method of curing a pressure-sensitive adhesive composition is not particularly limited. For example, the pressure-sensitive adhesive composition may be cured through a process of maintaining a composition at an appropriate temperature to perform a cross-linking reaction of the acrylic polymer and the multifunctional cross-linking agent, and a process of irradiating a composition with active energy rays to polymerize the active energy ray-curable compound. When both of the process of maintaining a composition at an appropriate temperature and the process of irradiating a composition with active energy rays are required to be performed, the processes may be performed sequentially or simultaneously. As such, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

According to one exemplary embodiment, the pressure-sensitive adhesive layer may have a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa. For example, such a pressure-sensitive adhesive layer may be a pressure-sensitive adhesive layer including the IPN.

According to another exemplary embodiment, the pressure-sensitive adhesive layer may have a storage modulus at 25° C. of 0.02 MPa to 0.08 MPa or 0.04 MPa to 0.08 MPa. Such a pressure-sensitive adhesive may be a pressure-sensitive adhesive layer including a cross-linking structure of the thermocurable component.

In addition, the present invention is directed to providing a method of manufacturing an optical element. The method of manufacturing an optical element according to one exemplary embodiment may include forming the liquid crystal layer on a top portion of the base layer and attaching a polarizer to a bottom portion of the base layer.

As such, the liquid crystal layer may, for example, be prepared by forming an alignment film on a base layer, forming a coating layer of a liquid crystal composition including the polymerizable liquid crystal compound on the alignment film and polymerizing the liquid crystal composition in an aligned state to form a liquid crystal layer.

The alignment film may be, for example, formed using a method of forming a polymer film such as polyimide on a base layer and performing a rubbing process, or coating an optically aligned compound and aligning the optically aligned compound by irradiation with linearly polarized light. Various methods of forming an alignment film are known in the art in consideration of desired alignment patterns, for example, patterns of the first and second regions.

The coating layer of the liquid crystal composition may be formed by coating a composition on the alignment film of the base layer using a known method. A liquid crystal layer may be formed by aligning a liquid crystal composition according to an alignment pattern of the alignment film disposed under the coating layer and polymerizing the liquid crystal composition.

A method of attaching a polarizer to a base layer is not particularly limited. For example, the liquid crystal layer may be attached to the polarizer using a method of coating the water-based adhesive composition on one surface of the base layer or the polarizer, bonding the liquid crystal layer and the polarizer by means of the coating layer and curing the adhesive composition, or a method of bonding a surface of the liquid crystal layer in which a primer layer is present with the polarizer through a dropping method using the water-based adhesive composition and curing the adhesive composition.

Also, the preparation method may further include forming a surface-treated layer on a top portion of the liquid crystal layer. As such, a method of forming a surface-treated layer is not particularly limited.

For example, when the resin layer is formed using the surface-treated layer, a resin layer may be formed by coating a liquid crystal layer with a coating solution including a variety of the above-described resin compositions, for example, active energy ray-curable acrylic resin compositions, and curing the coating solution.

As such, the coating solution may be coated using a conventional coating method such as spin coating or bar coating or a selective coating method such as an ink-jet method. A method of curing a coated coating solution is not particularly limited, and a method such as application of suitable heat or moisture or irradiation of active energy rays may be used according to the shapes of used compositions.

According to one exemplary embodiment, the curing may be performed, as described above, in a state where a coating solution comes in contact with a suitable mold, thereby forming desired protrusions in the resin layer.

In addition to the above-described operations, the preparation method may further include forming an additional layer such as the ¼-wavelength phase retardation layer or the pressure-sensitive adhesive layer. The formation of the additional layer is not particularly limited.

In addition, the present invention is directed to providing a stereoscopic image display device. The stereoscopic image display device according to one exemplary embodiment may include the above-described optical element.

According to one exemplary embodiment, the stereoscopic image display device may further include a display element that can generate an image signal for the left eye (hereinafter referred to as an "L signal") and an image signal for the right eye (hereinafter referred to as an "R signal"). In the optical element, the first and second regions of the liquid crystal layer may be arranged so that the L signal can penetrate through one of the first and second regions and the R signal can penetrate through the other region. As such, the optical element may be arranged so that the R and L signals can first penetrate through the polarizer of the optical element and then enter each region of the liquid crystal layer when the R and L signals are emitted from the display element.

As long as the stereoscopic image display device includes the optical element as a light-dividing element, a variety of methods known in the art may be applied to manufacture of the stereoscopic image display device.

FIG. 9 is a schematic diagram of a device according to one exemplary embodiment, showing a structure of the device obtained when an observer can wear the polarized glasses and observe a stereoscopic image.

For example, the device 9 may sequentially include a light source 91, a polarizing plate 92, the display element 93 and the optical element 94, as shown in FIG. 9.

As such, a direct type or edge type backlight generally used for liquid crystal display devices (LCDs) may be, for example, used as the light source 91.

According to one exemplary embodiment, the display element 93 may be a transmissive liquid crystal display panel including a plurality of unit pixels which are arranged in a row and/or column direction. One or two or more pixels are combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 10, or they may be formed in a lattice pattern and alternately arranged adjacent to each other, as shown in FIG. 11. In the liquid crystal layer 942 of the optical element 94, the first and second regions correspond to the LC and RC regions, respectively, and may be arranged in consideration of the arrangement of the RG and LG regions so that the R signal to be transmitted from the RG region can be incident to the RC region via the polarizer 941 and the L signal can be incident to the LC region via the polarizer 941.

For example, the display element 93 may be a liquid crystal panel including a first transparent substrate, a pixel electrode, a first alignment film, a liquid crystal layer, a second alignment film, a common electrode, a color filter and a second transparent substrate, which are arranged sequentially in a direction from the light source 91. The polarizing plate 92 may be attached to one side of the panel through which light is incident, for example, one side of the light source 91, and the optical element 44 may be attached to the other side of the panel, which is arranged opposite to the one side of the panel. A polarizer included in the polarizing plate 92 and a polarizer 941 included in the optical element 94 may be, for example, arranged so that the absorption axes of the two polarizers can be formed at a predetermined angle, for example, at an angle of 90°. Therefore, the arrangement of the two polarizers may allow light emitted from the light source 91 to penetrate through the display element 93 or be intercepted by the display element 93.

In a driving state, unpolarized light may be emitted toward the polarizing plate 92 from the light source 91 of the display device 9. In the light incident to the polarizing plate 92, light having a polarization axis parallel to the light transmission axis of the polarizer of the polarizing plate 92 may penetrate through the polarizing plate 92 and be incident to the display element 93. Light incident to the display element 93 and penetrating through the RG region may be converted into an R signal, light penetrating through the LG region may be converted into an L signal, and the R and L signals may then be incident to the polarizer 941 of the optical element 94.

In the light incident to the liquid crystal layer 942 through the polarizer 941, light penetrating through the LC region and light penetrating through the RC region are emitted, respectively, in a state where the two kinds of light have different polarized states. As described above, the R and L signals having different polarized states may enter the right and left eyes of an observer wearing the polarized glasses, respectively, and thus the observer may observe a stereoscopic image.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 2 and 3 are schematic diagrams showing the arrangement of first and second regions of a liquid crystal layer according to one exemplary embodiment.

FIGS. 10 and 11 are schematic diagrams showing the arrangement of RG and LG regions according to one exemplary embodiment.

DETAILED DESCRIPTION OF EXEMPLARY EMBODIMENTS

Figure 1:
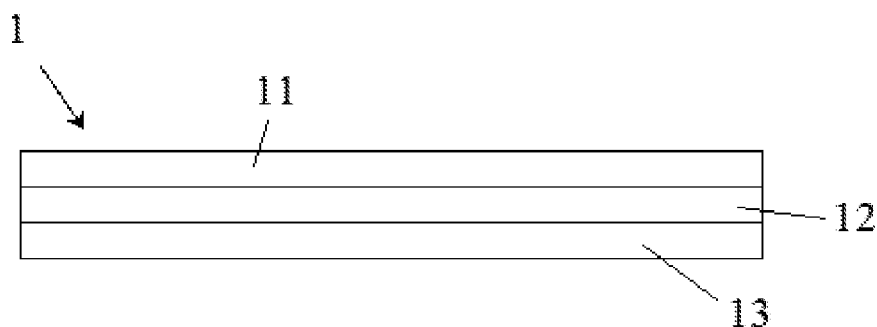
FIG. 1 is a schematic diagram showing an optical element according to one exemplary embodiment of the present invention.
Figure 2:
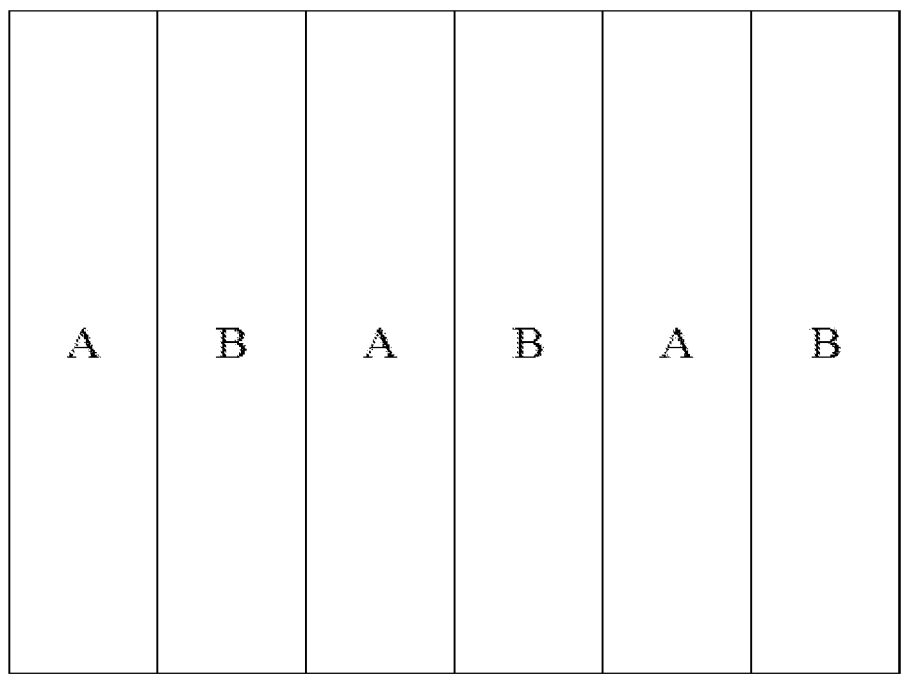
Figure 4:
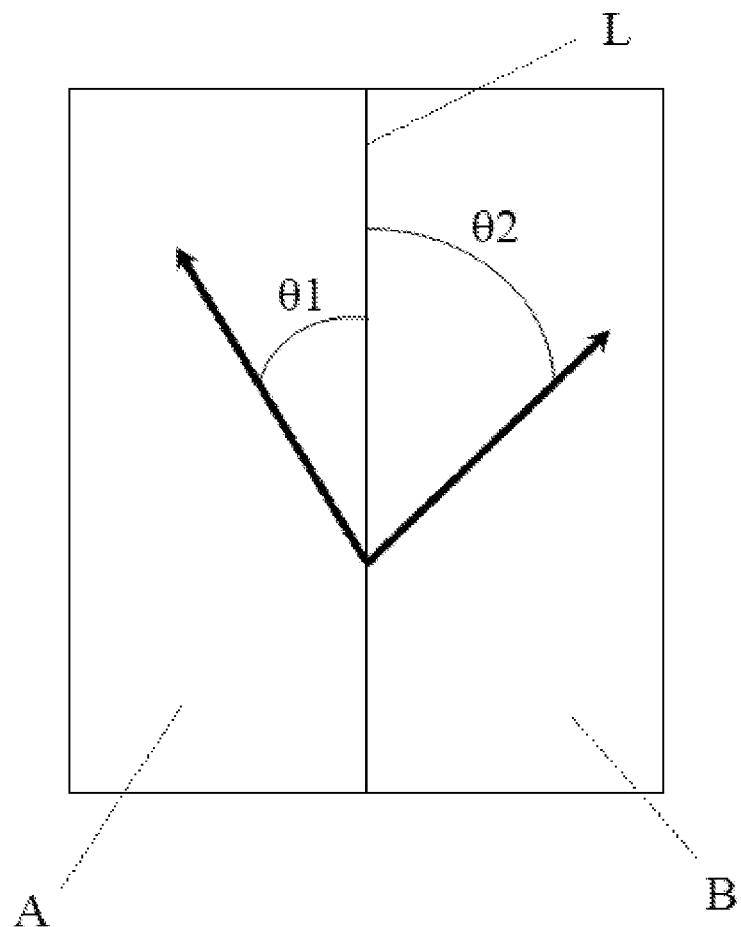
FIG. 4 is a schematic diagram showing the arrangement of optical axes of the first and second regions of the liquid crystal layer according to one exemplary embodiment.
Figure 5:
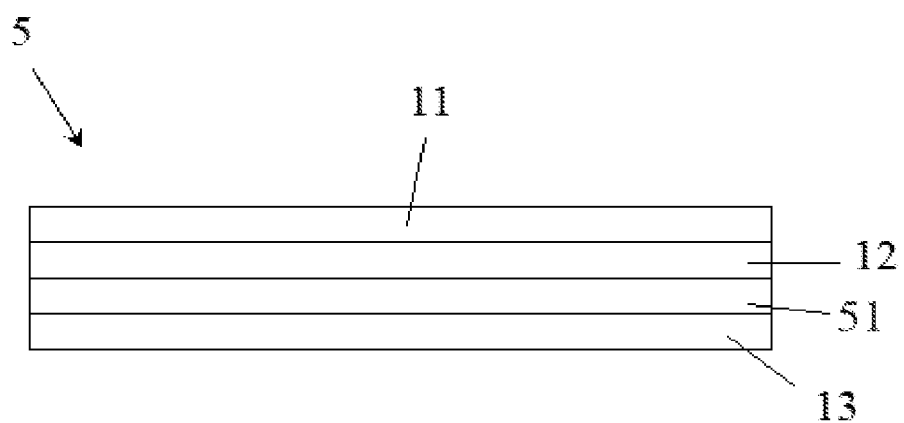
FIGS. 5 to 8 are schematic diagrams showing an optical element according to one exemplary embodiment.
Figure 6:
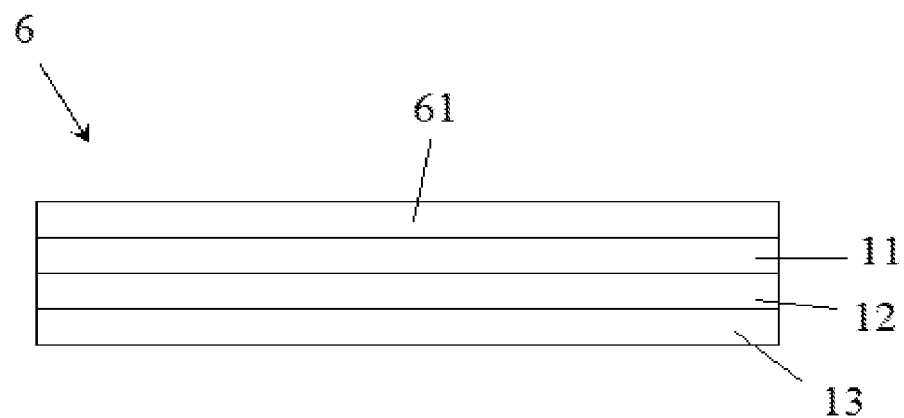
Figure 7:
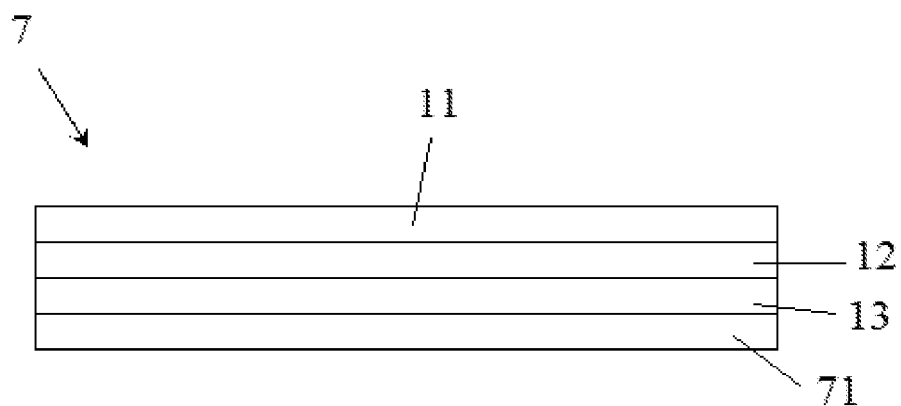
Figure 8:
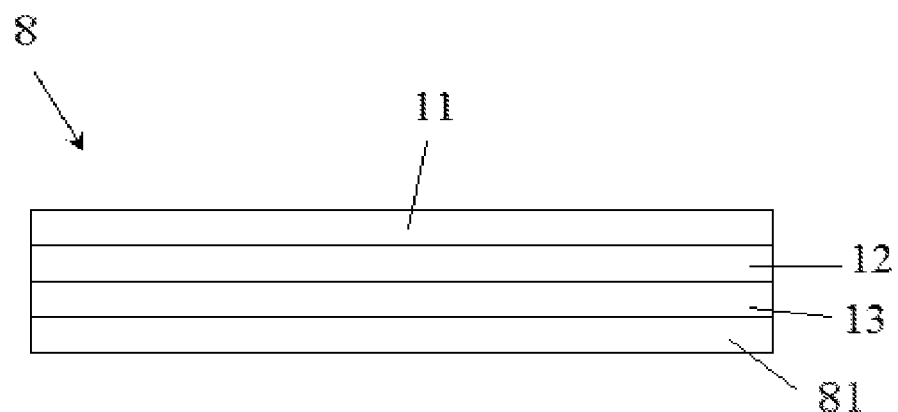

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The physical properties of optical elements prepared in Examples and Comparative Examples were evaluated as follows.

1. Evaluation of Adhesive Strength

The optical elements prepared in Examples 1 and 2 and Comparative Examples 2 to 4, in which a surface-treated layer, a liquid crystal layer, an alignment film, a base layer, an adhesive layer and a polarizer were sequentially formed, were evaluated for adhesive strength by peeling the polarizer at a peel angle of 90° and a peel rate of 300 m/min to measure a peel strength of the polarizer to the base layer (in the case of Comparative Example 1, a peel strength of the polarizer to the liquid crystal layer was evaluated). A peel test was carried out by cutting a prepared optical element into pieces having a width of 20 mm and a length of 100 mm.

2. Evaluation of Durability of Liquid Crystal Layer

The durability of a liquid crystal layer was evaluated by measuring a variation of a phase difference value caused after a durability test of the optical elements prepared in Examples and Comparative Examples. More particularly, an optical element was cut into pieces having a size of 10 cm×10 cm, and then attached to a glass substrate by means of a pressure-sensitive adhesive layer. The optical element was then kept under a heat-resistant condition of 80° C. for 100 hours or 250 hours. Then, a decrease (%) in phase difference values of the liquid crystal layer before and after being kept under the heat-resistant condition was calculated. The results are listed in the following Table 2. As such, the phase difference value was measured at a wavelength of 550 nm according to the manufacturer's manual using Axoscan (commercially available from Axomatrix).

The durability evaluation criteria are as follows.

<Evaluation Criteria>

O: Variations in phase difference values of all the optical elements after being kept under a heat-resistant condition for 100 hours and 250 hours are less than 8%.

X: A variation in phase difference value of any one of the optical elements after being kept under a heat-resistant condition for 100 hours and 250 hours is 8% or more.

3. Crosstalk Evaluation

Figure 9:
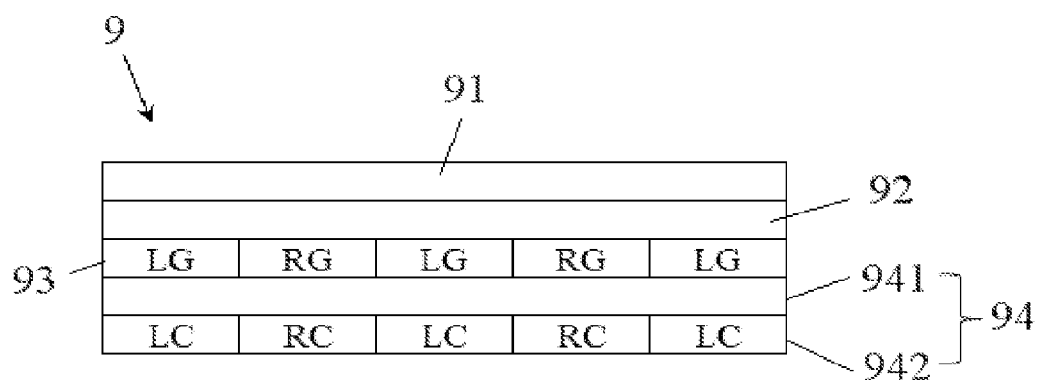
FIG. 9 is a schematic diagram showing a stereoscopic image display device according to one exemplary embodiment.
Figure 10:
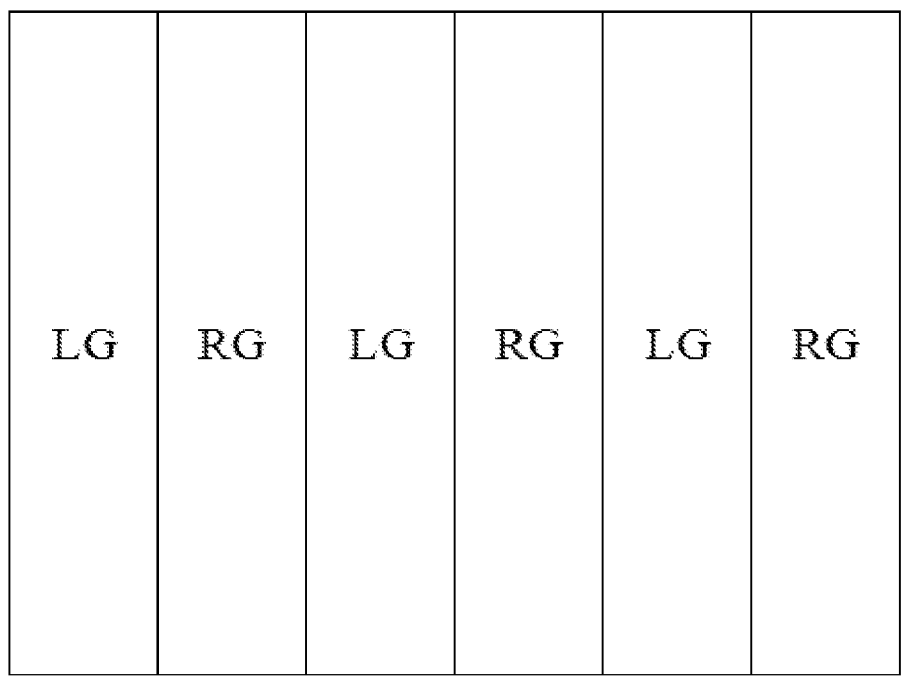

A crosstalk ratio may be defined as a ratio of brightness in a dark state and a bright state when a stereoscopic image is observed. In Examples and Comparative Examples, on the assumption that the optical element is applied to a stereoscopic image display device of a polarized glasses type, a crosstalk ratio is measured using the following method. The optical element is used to constitute a stereoscopic image display device as shown in FIG. 9. Then, the polarized glasses for observing a stereoscopic image are disposed in a conventional observation point for the stereoscopic image display device. As such, when a stereoscopic image is observed by an observer, the conventional observation point refers to a point which is disposed away from the center of the stereoscopic image display device by a distance corresponding to 3/2 of a length in a horizontal direction of the stereoscopic image display device. At such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses for the left and right eyes in the polarized glasses in a state where the stereoscopic image display device is allowed to output an L signal, and each of the lenses for the left and right eyes is measured for brightness. In this case, the brightness measured in the rear surface of the lens for the left eye is bright-state brightness, and the brightness measured in the rear surface of the lens for the right eye is dark-state brightness. After measurement of each brightness, a ratio of the dark-state brightness to the bright-state brightness ([dark-state brightness]/[bright-state brightness]) is converted into a percentage value (%), which may be defined as a crosstalk ratio (Y). Also, the crosstalk ratio may be measured in the same manner as described above, wherein the brightness in the bright and dark states may be measured in a state where a stereoscopic image display device outputs an R signal. In this case, the brightness measured in the rear surface of the lens for the left eye is dark-state brightness, and the brightness measured in the rear surface of the lens for the right eye is bright-state brightness. Similarly, a ratio of the dark-state brightness to the bright-state brightness is converted into a percentage value (%), which may be defined as a crosstalk ratio.

4. Evaluation of Phase Difference and Refractive Index

The phase difference and refractive index of an optical element or a liquid crystal layer were evaluated according to the manufacturer's manual using Axoscan (commercially available from Axomatrix).

5. Evaluation of Thickness and Width or Length of Optical Element

The width or length of an optical element was measured using 3-dimensional equipment, Premium 600C and IView Pro program (INTEK IMS Co., Ltd.). Also, the thickness measurement was performed using a spectral reflectometer, which is equipment that is able to evaluate characteristics of a thin film using interference between light reflected on a surface of the thin film and light reflected on an interface disposed under the thin film or phase difference of the lights.

Preparative Example 1

Preparation of Liquid Crystal Layer (A)

A composition for forming an optical alignment film was coated on one surface of a TAC base (refractive index: 1.49, thickness: 80,000 nm) so that a thickness after coating could amount to approximately 1,000 Å, and dried at 80° C. for 2 minutes in an oven. A composition used as the above-described composition for forming an optical alignment film was prepared by mixing a mixture of an acryl monomer and polynorbornene (molecular weight ($M_w$)=150,000) having a cinnamate group of the following Formula 14 with a photo-initiator (Irgacure 907) and dissolving the mixture in a toluene solvent so that a solid concentration of the polynorbornene could amount to 2% by weight (polynorbornene: acryl monomer:photoinitiator=2:1:0.25 (weight ratio)).

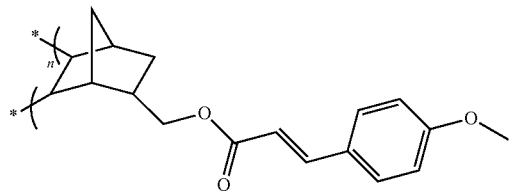

Formula 14

Next, the dried composition for forming an optical alignment film was aligned according to a method disclosed in Korean Patent Application No. 2010-0009723 to form an optical alignment film including first and second alignment regions which are aligned in different directions. More particularly, a pattern mask in which light-transmitting portions and light-intercepting portions in stripe shapes having widths of approximately 450 μm were alternately formed in a vertical direction and a horizontal direction was disposed on an upper portion of the dried composition, and a polarizing plate having two regions formed therein for transmitting two different kinds of polarized light was also disposed on an upper portion of the pattern mask. Then, the composition for forming an optical alignment film was aligned by irradiating the composition with UV rays (300 mW/cm$^2$) for approximately 30 seconds using the polarizing plate and the pattern mask, while transferring the TAC base 30 having the optical alignment film formed thereon at a rate of approximately 3 m/min. Then, a liquid crystal layer was formed on the alignment layer undergoing the alignment treatment. More particularly, a liquid crystal composition including 70 parts by weight of a multifunctional polymerizable liquid crystal compound represented by the following Formula A, 30 parts by weight of a monofunctional polymerizable liquid crystal compound represented by the following Formula B, and a suitable amount of a photoinitiator was coated onto the optical alignment film to a dry thickness of approximately 1 μm, and the liquid crystal composition was aligned according to alignment of the alignment layer arranged under the liquid crystal layer. Then, a liquid crystal layer, which includes first and second regions having different optical axes perpendicular to each other according to the alignment of the optical alignment film arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and fast axis direction was approximately 0.125.

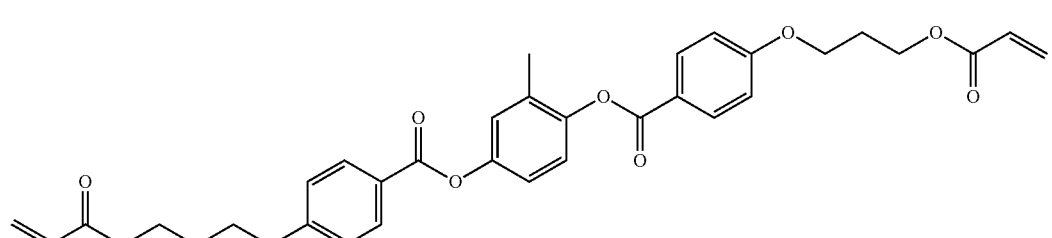

Formula A

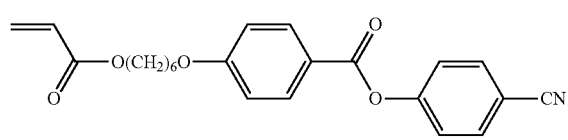

Formula B

Preparative Examples 2 to 5

Preparation of Liquid Crystal Layer (B) to Liquid Crystal Layer (E)

Liquid crystal layers were prepared in the same manner as in Preparative Example 1, except that a weight ratio of a multifunctional polymerizable liquid crystal compound and a monofunctional polymerizable liquid crystal compound included in the liquid crystal composition was adjusted as listed in the following Table 1.

TABLE 1

|  | Liquid crystal layer (B) | Liquid crystal layer (C) | Liquid crystal layer (D) | Liquid crystal layer (E) |
|---|---|---|---|---|
| Multifunctional polymerizable liquid crystal compound (A) | 55 | 45 | 40 | 10 |
| Monofunctional polymerizable liquid crystal compound (B) | 45 | 55 | 60 | 90 |
| Refractive index difference | 0.125 | 0.125 | 0.125 | 0.125 |
| Thickness (μm) | 1 | 1 | 1 | 1 |

Content unit: parts by weight
Refractive index difference: difference between in-plane refractive indexes of a liquid crystal layer in a slow axis direction and a fast axis direction Example 1

An optical element was manufactured as follows. First, in a structure prepared in Preparative Example 2, that is, a structure in which a TAC base, an alignment film and a liquid crystal layer were sequentially formed, the TAC base was attached to the polarizer of the polarizing plate, which includes a PVA-based polarizer having a TAC protective film formed on one surface thereof, using a water-based PVA-based adhesive composition. An adhesive composition generally used to attach the TAC protective film to the PVA polarizer was used as the adhesive composition. A surface of the TAC base and the polarizer were laminated using a dropping method. In this case, the adhesive composition was coated so that a thickness after curing a coating layer of the adhesive composition could amount to 1 μm, and the coating layer was maintained at an appropriate temperature to form an adhesive layer, by which the polarizer was attached to the surface of the TAC base. Thereafter, a conventional acrylic pressure-sensitive adhesive layer was formed on one surface of the TAC protective film, which is a protective film of the polarizer, to manufacture an optical element.

Example 2

An optical element was manufactured in the same manner as in Example 1, except that a structure prepared in Preparative Example 3, that is, a structure in which a TAC base, an alignment film and a liquid crystal layer (B) were sequentially formed, was used.

Comparative Example 1

An optical element was manufactured in the same manner as in Example 1, except that, in a structure prepared in Preparative Example 2, that is, a structure in which a TAC base, an alignment film and a liquid crystal layer were sequentially formed, the liquid crystal layer was attached to the polarizer of the PVA-based polarizer having a TAC protective film formed on one surface thereof.

Comparative Example 2

An optical element was manufactured in the same manner as in Example 1, except that a structure prepared in Preparative Example 4, that is, a structure in which a TAC base, an alignment film and a liquid crystal layer (C) were sequentially formed, was used.

Comparative Example 3

An optical element was manufactured in the same manner as in Example 1, except that a structure prepared in Preparative Example 5, that is, a structure in which a TAC base, an alignment film and a liquid crystal layer (D) were sequentially formed, was used.

Comparative Example 4

An optical element was manufactured in the same manner as in Example 1, except that a structure prepared in Preparative Example 6, that is, a structure in which a TAC base, an alignment film and a liquid crystal layer (E) were sequentially formed, was used.

The optical elements prepared in Examples and Comparative Examples were evaluated for physical properties. The evaluation results are listed in the following Table 2.

TABLE 2

|  | Adhesive strength (N/cm) | Durability of liquid crystal layers | Initial phase difference (nm) | Changes in phase difference (after being kept for 100 hours) | |
|---|---|---|---|---|---|
|  |  |  |  | Phase difference (nm) after being kept at heating conditions | Changes (%) |
| Example 1 | 3.5 or more | ○ | 125.4 | 119.7 | 4.5 |
| Example 2 | 3.5 or more | ○ | 120.7 | 114.1 | 5.5 |
| Comparative Example 1 | 0.3 | ○ | 125.4 | 119.7 | 4.5 |
| Comparative Example 2 | 3.5 or more | X | 94.1 | 85.5 | 9.1 |
| Comparative Example 3 | 3.5 or more | X | 77.2 | 69.4 | 10.1 |
| Comparative Example 4 | 3.5 or more | — | — | — | — |

—: A phase difference value cannot be measured since a liquid crystal layer is in a non-aligned state.

Experimental Example 1

Evaluation of Refractive Index Relationship of Liquid Crystal Layer and Light Division Property According to Thickness In order to evaluate the refractive index relationship of a liquid crystal layer and a light division property of the liquid crystal layer according to a thickness, a sample was prepared, as will be described later. More particularly, a phase retardation layer was formed in the same manner as in Preparative Example 1, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.03 after formation of the liquid crystal layer. Also, a phase retardation layer was prepared in the same manner using the same liquid crystal compound as in Preparative Example 1, wherein the phase retardation layer was prepared by forming liquid crystal layers having thicknesses of approximately 0.3 μm and 2.5 μm. Also, a phase retardation layer was formed in the same manner as in Preparative Example 1, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.22 after formation of the liquid crystal layer. Thereafter, an optical element was prepared in the same manner as in Example 1 using the prepared phase retardation layer, and crosstalk ratios obtained when the prepared optical element and the optical element of Example 1 were used to observe a stereoscopic image were evaluated. The results are listed in the following Table 3.

TABLE 3

| Liquid crystal layers of phase retardation layers | | |
|---|---|---|
| Refractive index difference* | Thickness (μm) | Crosstalk ratio (%) |
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

Refractive index difference represents a difference between in-plane refractive indexes of a liquid crystal layer in a slow axis direction and fast axis direction.

The optical element cording to one exemplary embodiment of the present invention may be a light-dividing element, for example, an element that can divide incident light into at least two kinds of light having different polarized states. For example, the optical element may be used to realize a stereoscopic image.

While the invention has been shown and described with reference to certain exemplary embodiments thereof, it will be understood by those skilled in the art that various changes in form and details may be made therein without departing from the scope of the invention as defined by the appended claims.

What is claimed is:

1. An optical element comprising:
   a base layer;
   a liquid crystal layer which is formed on a top portion of the base layer, of which a difference between in-plane refractive indexes in a slow axis direction and a fast axis direction is from 0.05 to 0.2, which has a thickness of 0.5 μm to 2.0 μm, which comprises a multifunctional polymerizable liquid crystal compound and a monofunctional polymerizable liquid crystal compound that are polymerized in a horizontally aligned state, the monofunctional polymerizable liquid crystal compound being comprised in an amount of greater than 0 parts by weight and not more than 100 parts by weight relative to 100 parts by weight of the multifunctional polymerizable liquid crystal compound, and which comprises first and second regions having different phase retardation properties; and
   a polarizer attached to a bottom portion of the base layer.

2. The optical element of claim 1, wherein the liquid crystal layer satisfies the conditions of the following Equation 1:

$$X < 8\% \qquad [\text{Equation 1}]$$

wherein X represents a percentage of a variation in a phase difference value of the liquid crystal layer obtained after the optical element is kept at 80° C. for 100 hours, relative to the initial phase difference value of the liquid crystal layer of the optical element.

3. The optical element of claim 1, wherein the liquid crystal compound is represented by the following Formula 1:

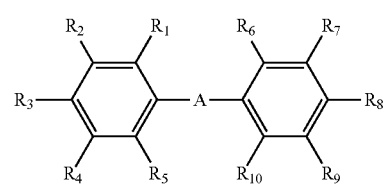

[Formula 1]

wherein A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 2, provided that at least one of the $R_1$ to $R_{10}$ is —O-Q-P or a substituent of the following Formula 2, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group:

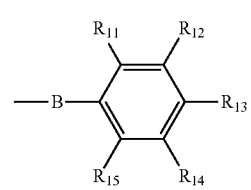

[Formula 2]

wherein the mark "—" indicated on the left side of the "B" means that the "B" is directly bound to the benzene ring of Formula 1, B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group.

4. The optical element of claim 1, wherein the first and second regions have optical axes formed in different directions.

5. The optical element of claim 4, wherein a line bisecting an angle formed between the optical axes of the first region and the second region is vertical or horizontal with respect to the absorption axis of the polarizer.

6. The optical element of claim 1, further comprising a water-based adhesive layer, by which the polarizer is attached to the base layer.

7. The optical element of claim 1, further comprising: a surface-treated layer formed on a top portion of the liquid crystal layer.

8. The optical element of claim 7, wherein the surface-treated layer is a high-hardness layer, an anti-glare layer or a low-reflection layer.

9. The optical element of claim 8, wherein the high-hardness layer is a resin layer of which a pencil hardness is 1H or more at a load of 500 g.

10. The optical element of claim 9, wherein the resin layer further comprises particles having a different refractive index than the resin layer.

11. The optical element of claim 10, wherein the particles have a difference in refractive index from the resin layer of 0.03 or less.

12. The optical element of claim 1, further comprising: a phase retardation layer arranged in a bottom portion of the polarizer.

13. The optical element of claim 1, further comprising:

a pressure-sensitive adhesive layer which is formed on one surface of the polarizer, which has a storage modulus at 25° C. of 0.02 MPa to 0.08 MPa, and which comprises a cross-linking structure of an acrylic polymer cross-linked using a multifunctional cross-linking agent.

14. The optical element of claim 1, further comprising:

a pressure-sensitive adhesive layer which is formed on one surface of the polarizer, which has a storage modulus at 25° C. of greater than 0.08 MPa, and which comprises a cross-linking structure including an acrylic polymer cross-linked using a multifunctional cross-linking agent and a cross-linking structure including a polymerized active energy ray-polymerizable compound.

15. A stereoscopic image display device comprising an optical element defined in claim 1.

16. The stereoscopic image display device of claim 15, further comprising a display element configured to generate image signals for left and right eyes, wherein the optical element is arranged so that the image signal for the left eye can pass through one of the first and second regions and the image signal for the right eye can pass through the other region.

* * * * *